United States Patent [19]

Ishida et al.

[11] 4,351,594
[45] Sep. 28, 1982

[54] ELECTRONIC EXPOSURE AND FLASH CONTROL SYSTEMS FOR SLIT-SHUTTER TYPE CAMERAS

[75] Inventors: Tokuji Ishida, Daito; Masayoshi Sahara, Sennan, both of Japan

[73] Assignee: Minolta Camera Kabushiki Kaisha, Osaka, Japan

[21] Appl. No.: 231,670

[22] Filed: Feb. 5, 1981

[30] Foreign Application Priority Data

Feb. 6, 1980 [JP] Japan .................................. 55-14044

[51] Int. Cl.³ .............................................. G03B 15/03
[52] U.S. Cl. .................................. 354/139; 354/60 F; 354/145; 354/149
[58] Field of Search ............... 354/33, 60 F, 129, 139, 354/145, 149

[56] References Cited

U.S. PATENT DOCUMENTS

| 3,846,811 | 11/1974 | Nakamura et al. ................... 354/33 |
| 3,868,701 | 2/1975 | Kawasaki . | |
| 4,016,575 | 4/1977 | Uchiyama et al. .................. 354/139 |
| 4,187,019 | 2/1980 | Uchiyama et al. .................. 354/139 |
| 4,192,595 | 3/1980 | Wakazono et al. ................. 354/139 |

OTHER PUBLICATIONS

*Electronic Flash Strobe* by Edgerton, McGraw-Hill Book, pp. 24-41.

Primary Examiner—Russell E. Adams
Attorney, Agent, or Firm—Watson, Cole

[57] ABSTRACT

A flash photography system adapted for the combination of an electronic flash device and a photographic camera with an electrically controlled shutter which, as in the case of two-curtain type focal plane shutters, effects film exposure with a slit scanning or sweeping over the film surface. To enable full film exposure of a scene being illuminated by the flash light, the electronic flash tube is controlled to emit light at a constant light intensity for a period sufficient enough to cover the time during which the shutter slit completes its travel. The flash light emission is initiated in synchronization with the actuation of the shutter, i.e., the commencement of the scanning or sweeping of the shutter slit. The flash light may be emitted prior to the shutter operation for the determination of camera diaphragm aperture.

11 Claims, 4 Drawing Figures

ELECTRONIC EXPOSURE AND FLASH CONTROL SYSTEMS FOR SLIT-SHUTTER TYPE CAMERAS

BACKGROUND OF THE INVENTION

1. Field of the Invention

The present invention relates to camera exposure control and flash control systems and more particularly to the combination of electronic flash tube control circuitry and exposure time control circuitry in cameras having a slit type shutter mechanism wherein a slit scans or sweeps over a film for photographic exposure. Although the invention is not restricted to the following, one of many typical examples of such a slit type shutter mechanism is a two-curtain type focal plane shutter having a first or leading shutter curtain and a second or trailing shutter curtain which travel one after another at a manually or automatically determined interval. In the case of high shutter speed with such a focal plane shutter, the second shutter curtain starts traveling to cover the film before the first shutter curtain completes its travel to fully uncover the film, whereby the film is exposed with the slit formed between the first and second shutter curtains "sweeping" the film surface. The present invention contemplates providing a combined camera and flash system effective for use with slit type shutter mechanisms that function in accordance with the above mode of operation.

2. Description of the Prior Art

It is well known that an ordinary electronic flash tube emits flash light for only a short period of time during which a shutter slit cannot move across the full width of the film, resulting in a partial or slit exposure of the film. This is likely to occur, for example, when the aformentioned two-curtain type shutter is operated at a high shutter speed, e.g. higher than 1/60 second, with the flash being fired. To avoid defective exposure with such two-curtain shutter slit mechanisms, camera operators have been advised to select a low or slow shutter speed for flash photography.

In another prior art camera flash device, as disclosed in Japanese published patent application No. Tokkosho 48-40421, the electronic flash tube is controlled to emit light at a constant intensity for a duration of time covering the traveling of the shutter slit. This light emission resembles that of an FP flash bulb and may enable uniform exposure of the film with slit type exposure wherein the shutter slit sweeps or scans over the film plane.

In this prior art camera flash device, however, the flash light maintained at a constant intensity (hereinafter called flat flash light) is initiated in synchronization with the ordinary X-type synchro switch of the camera. With the ordinary X-type synchro switch of the camera functioning with the two-curtain type focal plane shutter, the synchro switch contact is closed when the leading shutter curtain completes its travel. Therefore, in the case of high speed shutter operation, the trailing curtain will have already traveled for a considerable distance when the synchro switch contact is closed. This causes a part of the film to have been covered by the trailing shutter curtain before the initiation of the flash light, resulting in uneven exposure of the film. With an FP type synchro switch, which is closed prior to the start of exposure, no uneven exposure occurs. However, in consideration of the rising light intensity characteristics of an FP bulb, the FP synchro switch contact is normally designed to close 15 to 20 ms before the leading shutter curtain starts to uncover the film. In contrast thereto, the intensity of a normal electronic flash tube rises so rapidly that it may reach a desired intensity immediately after closure of the synchro switch such that the use of a normal flash tube with an FP type synchro switch results in the wasteful emission of flash light for a period of 15 to 20 ms before shutter operation, without contributing light to the film exposure.

SUMMARY OF THE INVENTION

Accordingly, a general object of the present invention is to provide an improved electronic flash system which enables uniform exposure for flash photography with slit type scanning shutter operation.

Another object of the present invention is to provide a flash photography system wherein flash light of a constant intensity is ensured for a period during which the film at the focal plane of the camera is fully exposed by a slit type shutter.

Still another object of the present invention is to provide a combination of an electronic flash device and a camera wherein, upon flash photography with a slit type shutter, the flash light is efficiently utilized in conjunction with the camera shutter operation such that the flash light is maintained constant as the shutter slit scans over the film at the focal plane.

Yet another object of the present invention is to provide a flash photography system wherein the flash light is not wastefully emitted without contribution to the film exposure but is ensured for the whole period during which the shutter slit scans or sweeps over the film surface.

To attain the above objects, and other objects, features and advantages of the invention, an electronic flash tube according to the present invention is triggered for flat flash light emission by a signal generated in response to operation of a camera exposure time control circuit trigger switch. Since the operation of the trigger switch is synchronized with the initiation of shutter opening, the flat flash light emission starts simultaneously with the start of film exposure, whereby the flat flash light is most effectively synchronized with the shutter operation. Moreover, as a trigger switch designed for an electrically controlled shutter is used for the initiation of the flat flash light emission, no additional means is required for the flash light emission in response to camera operation. This dispenses with the necessity of adjusting the timing of such additional means with respect to shutter operation, and because no special mechanical means is required, additional complexity of the camera mechanism is avoided.

According to an exemplary embodiment of the present invention, an electronic flash device is constructed such that it emits not only flat flash light for slit type exposure, but also flash light prior to a camera exposure operation for the measurement of distance from the camera to an object and/or for the determination of the diaphragm aperture for flash photography hereinafter referred to as preliminary flash light. The electronic flash device may further emit flash light having rapidly changing intensity. These different types of flash light may be selectively emitted in accordance with manual changeover operation or in response to a signal from a camera to attain any desired mode of flash firing in any desired sequence. To obtain such a signal from the camera, gate circuitry is provided in the exposure control circuitry.

In accordance with the present invention, the trigger switch normally provided in an electric shutter camera circuit is used as the timing switch for the initiation of flat flash light emission, whereby no additional mechanical switch is required for timing the initiation of the flash light, and the electric energy for generating the flash light emission is efficiently used.

The above and other objects and features of the invention are more fully apparent from a consideration of the following description taken in conjunction with the accompanying drawings setting forth an exemplary embodiment of the best mode of carrying out the invention.

DETAILED DESCRIPTION OF THE PREFERRED EMBODIMENTS

Figure 1:
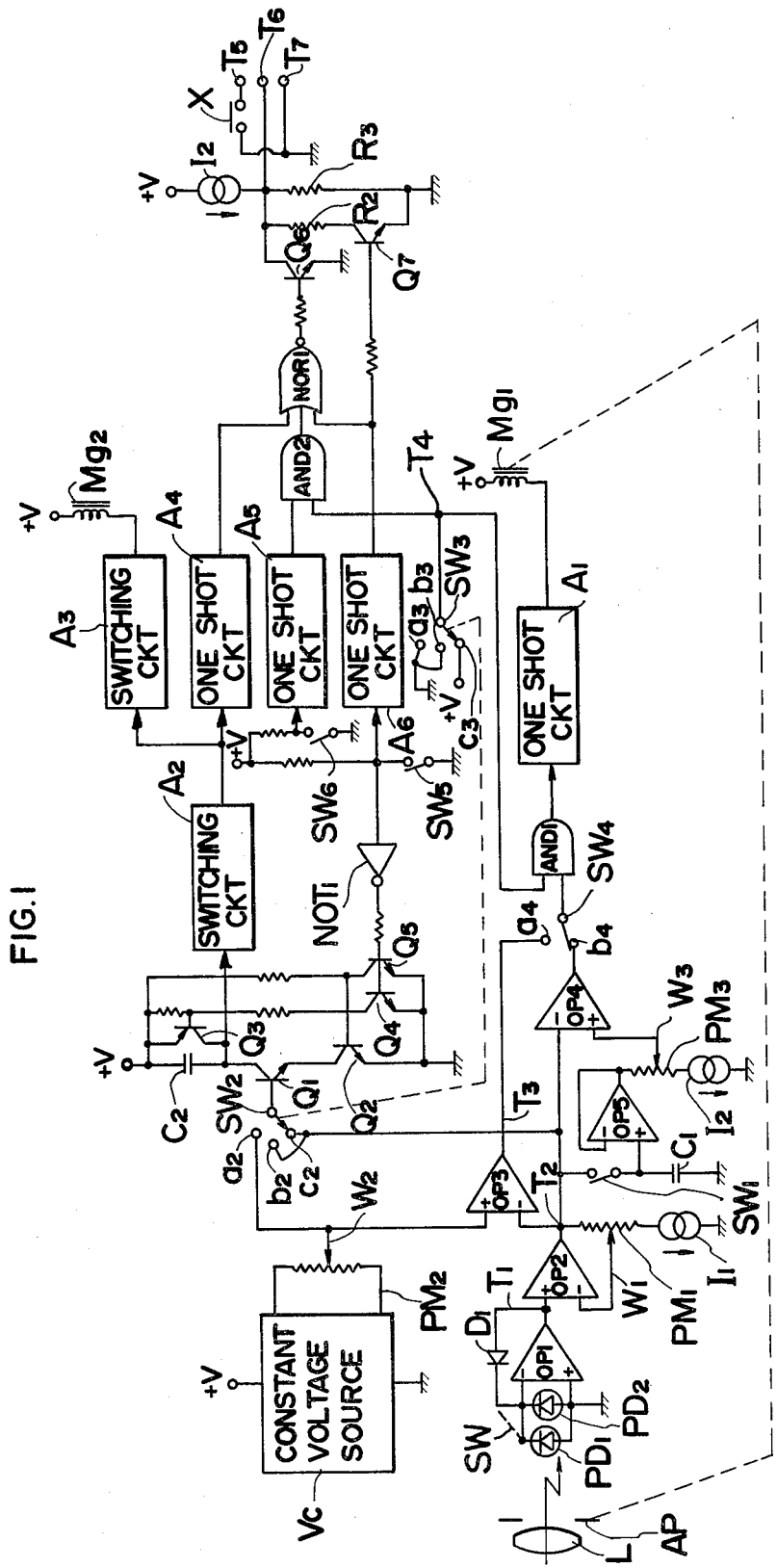
FIG. 1 is a circuit diagram of a camera exposure control circuit according to an exemplary embodiment of the best mode of accomplishing the present invention.

FIG. 1 shows an exemplary embodiment of an exposure control circuit in accordance with the invention and which is adapted for use in a single-lens reflex camera with a two-curtain type focal plane shutter and which is also capable of generating a trigger signal for initiating flat flash light emission. The exposure control circuitry is designed to perform at least any selected one of the following modes of exposure control operation: diaphragm priority automatic shutter speed control, shutter speed priority automatic diaphragm control, and a manual control for exposure control relying on manual settings of both the shutter speed and the diaphragm aperture.

With the diaphragm priority mode selected, the diaphragm is stopped-down to a manually preset value in response to the shutter release operation. This is followed by retraction of the reflex mirror from the photographic optical path and subsequent release of the leading shutter curtain. The trailing shutter curtain is released to start traveling after a lapse of time which is controlled in accordance with the output of a first light receiving element which in turn receives the scene or object light passed through the camera objective and reflected from the surface of the leading shutter curtain which has a reflection index that is substantially identical to that of the film surface.

When the shutter speed priority mode is selected, the light measurement is made by a second light receiving element which receives the scene light passed through the camera objective, with the diaphragm aperture stopped-down, and then reflected by the reflecting mirror. When the value of the light measurement as a function of the output of the second light receiving element reaches a predetermined value relative to a manually preset shutter speed value and the film sensitivity value, the diaphragm stopping-down operation is interrupted to thereby automatically determine the diaphragm aperture. After the reflecting mirror has retracted from the optical path, the scene light passed through the automatically determined diaphragm aperture and then reflected by the surface of the leading shutter curtain and/or film surface at the camera focal plane is measured by the first light receiving element to control the actuation of the trailing shutter curtain for exposure termination.

With reference to FIG. 1, photodiodes PD2 and PD1 serve as the first and second light receiving elements in the light measuring circuit. Photodiode PD1 is located at such a position to receive scene light passed through the camera objective and reflected by the reflex mirror when the latter is at the viewing position intersecting or blocking the photographic light path. For such purpose, photodiode PD1 may, for example, be disposed to face the light emitting surface of the pentagonal prism of the camera viewfinder system. Photodiode PD2 may be disposed, for example, at the bottom of the camera mirror box to receive scene light passed through the camera objective and the diaphragm aperture and reflected by the surface of the leading shutter curtain and the film surface at the focal plane after the reflecting mirror has retracted from the photographic light path. Photodiodes PD1, PD2, operational amplifier OP1 and diode D1 together constitute a conventional logarithmic compression type light measuring circuit which generates at output terminal T1 a voltage proportional to the logarithm of the brightness of the light incident upon photodiode PD1 or PD2. It is to be noted that, although both photodiodes PD1 and PD2 are connected in parallel across the input terminals of operational amplifier OP2, no light impinges upon one of the photodiodes while the other receives light, as is clear from their respective locations in the camera. Thus, the outputs are alternatively and selectively taken from photodiodes PD1 or PD2. To ensure this alternative selection, a selector switch may be provided between photodiodes PD1 and PD2 (as illustrated by switch SW shown in dotted lines in FIG. 1), and this selector switch may be designed to respond to the movement of a reflecting mirror, for example.

Slider W1 of potentiometer PM1 is connected to the negative input terminal of operational amplifier OP2 and is settable to a position commensurate with a selected film sensitivity. Operational amplifier OP2, potentiometer PM1 and constant-current source I1 constitute an operational circuit for incorporating film sensitivity information in the output of the light measuring circuit. The operational circuit electrically performs a known photographic calculation, using the output of the light measuring circuit and the film sensitivity signal, thereby generating an output terminal T2 a voltage signal corresponding to the shutter speed suitable for the measured scene brightness, set diaphragm aperture AP and film sensitivity.

The voltage signal from output terminal T2 is supplied to the negative input terminals of operational amplifiers OP3 and OP4 which serve as voltage comparator circuits. The voltage signal at output terminal T2 is also supplied through switch SW1 to the positive input terminal of operational buffer amplifier OP5. The positive input terminal of operational amplifier OP3 is connected to slider W2 of potentiometer PM2. Both end terminals of potentiometer PM2 are connected across constant voltage source Vc, and slider W2 is linked with a manual shutter speed setting dial (not shown) to provide a voltage corresponding to a set shutter speed, and is also connected to the positive input terminal of operational amplifier OP3 as well as to contact a2 of switch SW2. A voltage comparator circuit consisting of operational amplifier OP3 inverts the voltage level at output terminal T3 from "Low" to "High" when the input voltage from terminal T2 to the negative input terminal becomes lower than the voltage input to the positive input terminal according to a manually set shutter speed.

Switches SW2 and SW3 are linked together and changed-over, in response to operation of an exposure mode setting means (not shown), to respective contacts a2 and a3 for selection of the manual control mode, to respective contacts b2 and b3 for the diaphragm priority mode and to respective contacts c2 and c3 for shutter speed priority mode. Switch SW2 transmits to the base of transistor Q1 a voltage signal from slider W2 in the manual control mode, and transmits the output signal at terminal T2 to the base of transistor Q1 in the diaphragm priority mode and shutter speed priority mode. Switch SW3 supplies a given high voltage V to terminal T4 which is input to one input terminal of each of gates AND 1, AND 2 in the shutter speed priority mode, and grounds terminal T4 and the respective AND gate input terminals in the other modes.

One-shot circuit A1 supplies current for energizing the coil of electromagnet Mg1 for a specific period of time in response to inversion of the output of gate AND 1 from the "low" to "High" level. A permanent magnet is used for the core of electromagnet Mg1 to attract and retain an armature piece (not shown) which is interlocked with a diaphragm arresting member in the diaphragm aperture stopping mechanism, prior to the start of photographic operation of the camera, thereby allowing the diaphragm to be driven as required to determine diaphragm aperture AP. When current is supplied to the coil of electromagnet MG1, the armature piece thereof is released by the resulting electromagnetic force which counteracts the permanent magnet magnetic force and the diaphragm arresting member is allowed to move to a diaphragm restricting position by a biasing force exerted thereto, whereby the stopping-down operation of diaphragm aperture AP is arrested. Known circuits and mechanisms may be used for the above described light measuring circuit, manual shutter speed signal generating circuit, voltage comparator circuit and diaphragm control device employing the diaphragm stopping-down arresting means including electromagnet Mg1. Consequently, in FIG. 1 the diaphragm stopping-down mechanism and the diaphragm arresting lever are not specifically illustrated as such components are well known to the photographic camera art to which the invention pertains.

A circuit comprising operational amplifiers OP4 and OP5, switch SW1, capacitor C1, potentiometer PM3 and constant current souce I2 is designed to measure the light from a scene to be photographed and determine or set the diaphragm aperture to a specific value which is not dependent on the brightness of the scene. Switch SW1 is opened in response to the shutter release operation immediately before the start of the stopping-down of diaphragm aperture AP, to store in capacitor C1 the voltage signal from output terminal T2 relying on the light measurement through the fully open diaphragm aperture. The voltage stored in capacitor C1 appears at the output terminal of buffer operational amplifier OP5. Slider W3 of potentiometer PM3 is linked with a minimum f-number, i.e., fully open diaphragm aperture value information pin (not shown) which is provided on an objective lens barrel and is set to a position commensurate with the minimum f-number of an objective lens, as is well known to the photographic camera art to which the invention pertains. For example, in the case of an exchangeable lens having a minimum f-number of F1.4, slider W3 is set to a position where the voltage thereat is lower than the voltage at terminal T4 by an amount corresponding to four steps of the exposure parameter, i.e., a voltage variation at terminal T4 of 4 EV of the parameter in the sense of the APEX system. For a lens whose minimum f-number is F1.7, slider W3 is set to a position where the voltage thereat is lower than the voltage at terminal T4 by an amount corresponding to 3.5 steps. Thus, in the present exemplary embodiment, the voltage at slider W3 is reduced by an amount corresponding to the number of steps from F5.6 to the minimum f-number of the lens in use. Consequently, the output of voltage comparator circuit OP4 is inverted from the "Low" to "High" level when diaphragm aperture AP is stopped-down to the size corresponding to the aperture value of F5.6. Diaphragm aperture AP is set to F5.6 with switch SW4 connected with contact b4. It should be understood that, as will be explained in detail below, flash light is emitted from an electronic flash device at a constant intensity for a specific period of time towards an object in the process of the above described diaphragm control, with the flash light being used as auxiliary light for the diaphragm control. The flash light emitted for such a purpose is hereinafter referred to as "preliminary flash light", because it is emitted prior to shutter operation accompanying actual flash firing.

The foregoing description explains the diaphragm control section of the exposure control circuitry. The following description is of the exposure time control operation and the construction of the circuitry for generating signals to control the electronic flash device.

Transistor Q1 is used as a logarithmic expansion transistor which generates, through its collector, a current proportional to the anti-logarithm of the exposure time representative voltage applied across the base emitter of transistor Q1. Capacitor C2 integrates the collector current of transistor Q1. Transistors Q2, Q3, Q4 and Q5 function as respective switch elements, and their switching conditions are controlled by switch SW5. Switch SW5 is a trigger switch designed to be opened in synchronization with the start of movement of the leading shutter curtain. When trigger switch SW5 is opened, the output of inverter NOT1 inverts to a "Low" level, causing transistors Q4 and Q5 to be turned off to thereby turn transistor Q2 on and transistor Q3 off. As a result, the collector current of transistor Q1 starts flowing for charging capacitor C2, whereby counting of exposure time begins. Switching circuit A2 inverts the level of its output, for example, from "Low" to "High" when the charged voltage of capacitor C2 reaches a predetermined level. Electromagnet Mg2 is adapted to be energized by a known means (not shown) with the application of electrical power to the pertinent circuitry in response to the shutter release operation, thereby restraining the trailing shutter curtain at a charged or cocked position. In response to the inversion of switching circuit A2 electromagnet Mg2 is de-energized, whereby the trailing shutter curtain is released from its restrained condition to start traveling. At the same time, one shot circuit A4 generates a "High" level pulse in response to the inversion of switching circuit A2 to terminate flash light emission as described later. The duration of the pulse may be extremely short and a differentiation circuit may be employed for one-shot circuit A4. It should be noted that switching circuit A3 is also a power amplification stage for driving electromagnet Mg2.

The "High" level pulse from one-shot circuit A4 is input to gate NOR 1, and in response thereto, the output of gate NOR 1 switches to a "Low" level, causing transistor Q6 to be turned off. Therefore, current from constant current source I2 flows through resistor R3, and signal VS1 of a given voltage is provided at terminal T6.

However, a "High" level pulse is generated for a specified period of time, e.g., approximately 15 ms, from one-shot circuit A6 in response to the opening of trigger switch SW5 upon the start of movement of the leading shutter curtain. The pulse from one-shot circuit A6 is input to gate NOR 1 to make its output "Low", causing transistor Q6 to be turned off and transistor Q7 turned on. The constant current from constant current source I2 flows to parallel connected resistors R2 and R3, whereby voltage VS2 of a given value is generated from terminal T6 due to a voltage drop relying on the composite resistance of resistors R2 and R3.

Switch SW6 is a release switch to be closed when the shutter button is depressed for the shutter release operation. With the release switch closed, an electromagnetic release mechanism (not shown) starts operating, and a "High" level pulse is generated for a specific period of time from one-shot circuit A5. When switch SW3 is connected to contact c3, the high level pulse from one-shot circuit A5 passes through gate AND 2 and is input to gate NOR 1 to make the output thereof a "Low" level for the duration of the high level pulse. During this period, a specific level voltage VS1 is generated from terminal T6 due to a voltage drop resulting from the flow of constant current I2 through resistor R3. It should be understood that the pulse duration of one-shot circuit A5 may be determined to be equal to or a little longer than the time, e.g., 20 ms, required for diaphragm aperture AP to be stopped-down from the minimum f-number of the maximum f-number The following description of the exposure control operation for the circuitry of FIG. 1 is taken with reference to FIG. 3 which shows the timing relationship between the operation of certain components of the circuit of FIG. 1 and a signal generated in response thereto.

A shutter speed is manually preset to any desired value for the shutter speed priority mode (by any mechanism known to the photographic camera art), and switches SW2 and SW3 are connected to respective contacts c2 and c3 and switch SW4 is connected to contact a4. A shutter release operation with these settings causes a power switch (not shown) to be closed for applying electrical power to the circuitry of FIG. 1, whereby the diaphragm drive mechanism starts operating and diaphragm aperture AP is stopped-down at a specific speed. The light passing through the diaphragm aperture is measured by photodiode PD1, and a voltage is provided at terminal T2 corresponding to the logarithmic compression value with the film sensitivity information being incorporated therein. The voltage at terminal T2 is compared by operational amplifier comparator circuit OP3 with the voltage from slider W2 commensurate with the manually preset shutter speed. When the voltage at terminal T2 is lowered to the voltage of slider W2, the output terminal T3 of comparator circuit OP3 is inverted from a "Low" to a "High" level. AND circuit AND 1, one input terminal of which receives a "High" level signal of +V as an input through switch SW3 connected to contact C3, inverts its output from a "Low" to a "High" level in response to the inversion of the voltage level at terminal T3 through switch SW4 connected to contact a4. As a result, one-shot circuit A1 actuates electromagnet Mg1 for a short period of time to interrupt the diaphragm stopping-down operation, thereby determining the diaphragm aperture.

Next, a conventional mechanism (not shown) retracts the reflecting mirror from the photographic optical path. After completion of the reflex mirror retraction the leading shutter curtain starts traveling. This causes switch SW5 to open, turning transistors Q4 and Q5 off. As a result, transistor Q2 is turned on, causing the emitter collector current of logarithmic expansion transistor Q1 to flow. At the same time, transistor Q3 is turned off, whereby the short circuit for integrating capacitor C2 is opened. At this time, the light measuring circuit generates at terminal T2 a voltage signal corresponding to the output of photodiode PD2 which receives the scene light passing through the automatically determined diaphragm aperture as described above and reflected by the leading shutter curtain surface and/or film surface. The signal from terminal T2 is supplied through contact c2 of switch SW2 to the base of transistor Q1. When the voltage of integrating capacitor C2 charged by a current proportional to the anti-logarithm of the base voltage reaches a predetermined level, switching circuit A2 inverts to de-energize electromagnet Mg2 by the output of switching circuit A3, allowing the trailing shutter curtain to travel for exposure termination.

For diaphragm priority mode operation, a diaphragm preset ring (not shown) is manually set to any desired value and switches SW2 and SW3 are connected to respective contacts b2 and b3, and switch SW4 is connected to contact a4. Upon depression of the shutter release button with these settings, a power switch is closed and the diaphragm stopping-down operation starts, both operations being accomplished by mechanism well known to the art. However, the input terminal of gate AND 1 connected to terminal T4 is grounded through terminal b3 of switch SW3, causing gate AND 1 to be blocked at a "Low" level. This results in the output of voltage comparator circuit OP3 being blocked by gate AND 1 and electromagnet Mg1 is not actuated. Thus the diaphragm aperture is determined to a manually set value by a conventional diaphragm preset mechanism. After the determination of the diaphragm aperture AP, the shutter speed is automatically controlled in accordance with TTL light measurement in a similar manner to the shutter speed priority mode previously described.

In the manual mode with switches SW2 and SW3 connectd to respective contacts a2 and a3, the shutter speed is controlled in response to the voltage from slider W2 which is supplied through contact a2 to the base of transistor Q1 after the diaphragm aperture has been stopped-down to a manually set value in a similar manner as described in the diaphragm priority mode.

Figure 2:
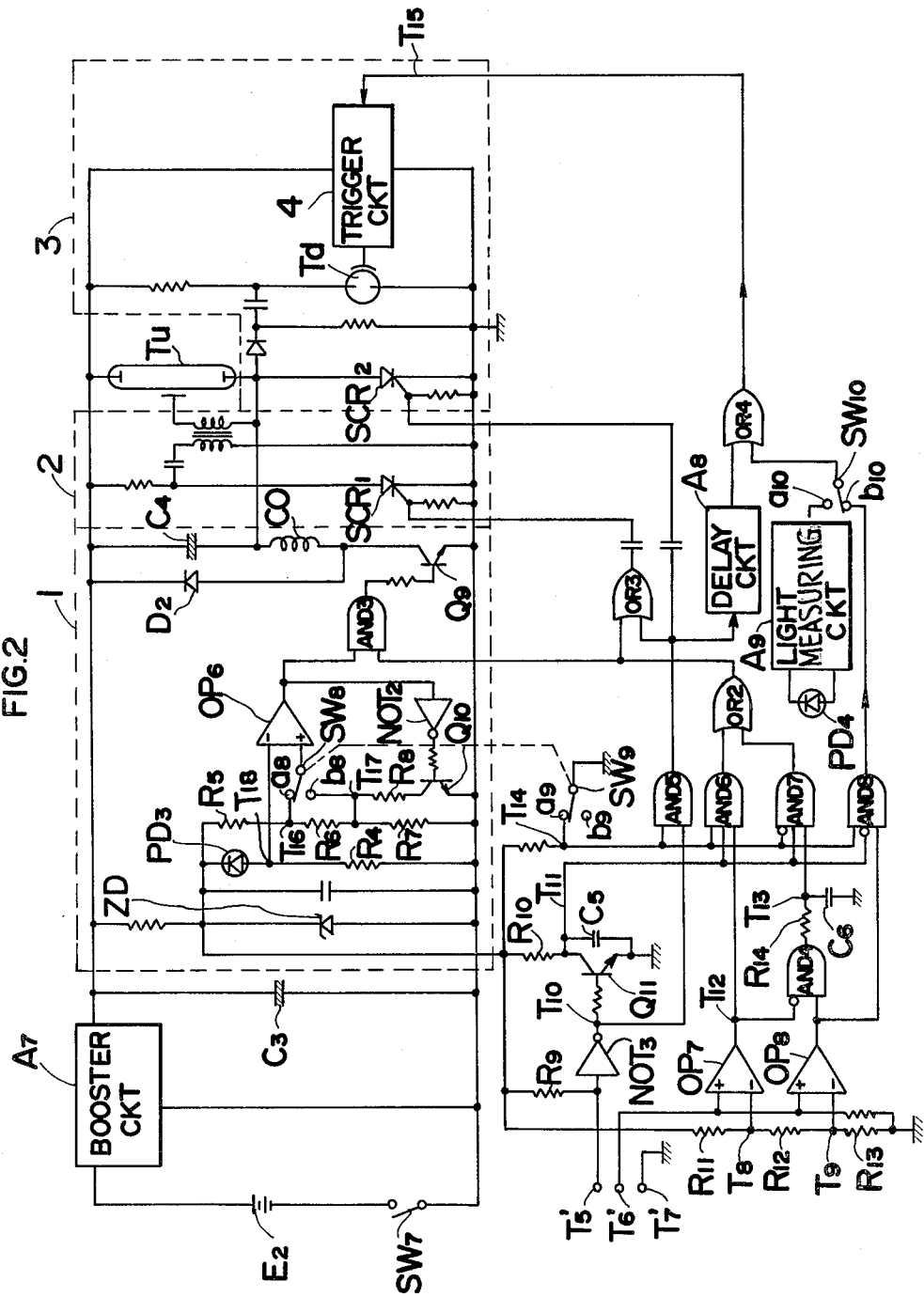
FIG. 2 is a circuit diagram of an exemplary embodiment of an electronic flash tube control circuit for combined use with the exposure time control circuitry of FIG. 1.

The following description is with respect to FIG. 2 representing an exemplary embodiment of an electronic flash control circuit for use in association with the exposure control circuitry of FIG. 1. With reference to FIG. 2, main capacitor C3 supplies electrical energy to electronic flash tube Tu for flash light emission. With power switch SW7 closed, main capacitor C3 is charged to a voltage level, e.g., approximately 300 V through booster circuit A7 which operates from the electrical power supplied from power cell E2. Block 2 (enclosed by a dotted line) is a conventional trigger circuit for triggering the firing of flash tube Tu. Block 3 is a conventional circuit for terminating the flash light emission of flash tube Tu. Trigger circuit 4, identical in circuit construction to block 2, is designed to ignite discharge tube Td when a "High" level voltage is supplied to input terminal T15. Additionally, block 1 is a control circuit designed to regulate the flash light emitted from flash tube Tu to be constant in intensity over a required period of time.

The basic operation of control circuit 1 is as follows: First, thyristor SCR1 is triggered to actuate trigger circuit 2 for firing electronic flash tube Tu. At this time, thyristor SCR2 remains off and power transistor Q9 is turned on. This causes main capacitor C3 to be discharged through flash tube Tu, coil CO and transistor Q9. The discharge current is not suddenly increased because of the induction of coil CO. The light from flash tube Tu (being energized by the discharge current from main capacitor C3) is received by photodiode PD3, and when the intensity of the received light reaches a predetermined value, transistor Q9 is inverted to turn off. Thus, no current flows through transistor Q9, while the charge stored in capacitor C4 and energy stored in coil CO in the form of a magnetic field are converted into a current flowing through diode D2 and supplied to flash tube Tu. Thus, flash tube Tu continues flash light emission even when transistor Q9 is turned off, although the intensity of the flash light decreases. When the intensity of the flash light decreases to a predetermined level, transistor Q9 is turned on again to increase the intensity of flash light. This operation is repeated thereafter. The cycle of the repetition of the operation is in the order from tenths to hundreths of seconds and for all practical purposes the light intensity of the flash tube can be regarded as substantially constant. The above described control of the conduction of transistor Q9 is described more fully hereinafter.

The following is a detailed description of the construction and operation of control circuit 1 of FIG. 2. The series connected resistor and Zener diode ZD generate a low constant voltage across Zener diode ZD. Photodiode PD3 is disposed at an appropriate location inside the electronic flash device so that it may receive flash light directly from flash tube Tu. It is to be noted that the word "direct" means that the flash light directly impinges on photodiode PD3, without being reflected by a photographic object, and that adoption of a light restricting member such as an ND filter or an apertured plate in front of photodiode PD3 is intended to be included in the meaning of "direct". Operational amplifier OP6 is used as a voltage comparator circuit and to the negative input terminal thereof is applied the voltage developing across resistor R4 and proportional to the photocurrent of photodiode PD3. To the positive input terminal of operational amplifier OP6, a voltage at node T16 between resistors R5 and R6, or at node T17 between resistors R6 and R7, is applied through switch SW8. Switch SW8 serves to select the reference voltage level applied to the positive input terminal of operational amplifier OP6, and is connected to contact b8 for preliminary flash light emission and is switched to contact a8 for flash light emission with constant intensity and synchronized with high shutter speed, i.e., slit exposure (hereinafter referred to as flat flash light) to be described later. The voltage level at contact a8 is higher than that at contact b8. Switch SW8 is provided to make the intensity of flat flash light higher than that of preliminary flash light.

A circuit comprising inverter NOT2, transistor Q10 and resistor R8 is designed to add hysteresis characteristics to voltage comparator circuit OP6. With this circuit, when the output of voltage comparator circuit OP6 is at a "High" level, the output of inverter NOT2 is at a "Low" level, causing transistor Q10 to be turned off, whereby only resistor R7 is connected between terminal 17 and ground. When the output of voltage comparator circuit OP6 is at a "Low" level, the output of inverter NOT2 inverts to a "High" level, causing transistor Q10 to be turned on, whereby resistors R7 and R8 are connected in parallel between terminal 17 and the ground. As a result, the voltage to be applied to the positive input terminal of voltage comparator circuit OP6 is higher when the output thereof is at a "High" level than when it is at a "Low" level. This means that once the output of voltage comparator circuit OP6 is switched to "Low" level when the gradually rising potential at node T18 exceeds a first potential at terminal T16 or T17 as determined by the resistor divider network of resistors R5, R6 and R7, the output remains at "Low" level even after the gradually lowering potential at node T18 reaches the first potential, until the potential at node T18 exceeds a second potential which is lower than the first potential and which is determined by the resistances of resistors R6 and R5 and the compound resistance of parallel connected resistors R7 and R8 when transistor Q10 is conductive. When the voltage at node 18 becomes lower than the second potential, the output of voltage comparator circuit OP6 is inverted again, and remains uninverted thereafter until the voltage at the node exceeds the first potential. Gate AND 3 is unblocked to effect the above flash light control only for a period during which a gate signal is applied thereto, as described later.

The following description is of a circuit for generating control signals to gate AND 3, each gate of thyristors SCR1 and SCR2 and trigger circuit 4. Terminals T5', T6' and T7' are to be electrically connected to corresponding terminals T5, T6 and T7 (illustrated in FIG. 1) of a camera when the electronic flash device is mounted on the camera, for example, by means of accessory shoe coupling. When synchro switch X in the camera (see FIG. 1) is closed, terminal T5' is inverted to a "Low" level, causing the output of inverter NOT3 to invert to a "High" level. The output of inverter NOT3 at this time is supplied through AND gate AND 5 to the gate of thyristor SCR2 with switch SW9 connected to contact b9, and is also supplied through OR gate OR 3 to the gate of thyristor SCR1 as is more fully described hereinafter. This causes flash tube Tu to be fired with main capacitor C3 being discharged through a discharge path through flash tube Tu and thyristor SCR2. At the same time, delay circuit A8 starts delay operation. When synchro switch X is closed, delay circuit A8 generates a "High" level voltage signal to trigger circuit 4 for a short time, e.g., 1 ms after the closure of synchro switch X. Thus, even when a flash light terminating signal is not generated by the circuit described later, the flash light of the flash tube is terminated by the output from delay circuit A8. If the delay time of delay circuit A8 is made manually variable, by any means known to those skilled in the art, the quantity of flash light will be variable accordingly. It should be noted that delay circuit A8 is provided to prevent any excessive unnecessary flash light generation, since main capacitor C3 for storing energy for flash light energization should have much larger capacitance, e.g., 2000 $\mu$F than that of a capacitor for an ordinary electronic flash device.

When the output of inverter NOT3 switches to a "High" level in response to the closure of synchro switch X, transistor Q11 is turned on, causing the collector potential thereof to change to a "Low" level. That "Low" level collector voltage serves as a blocking signal to gates AND 6 and AND 7 and an unblocking signal to gate AND 8. With switch SW9 connected to contact a9 for the selection of the flat flash light mode, a ground or "Low" level voltage at node T14 serves as a blocking signal to gates AND 6 and AND 8 and an unblocking signal to gate AND 7. A circuit comprising operational amplifiers OP7 and OP8 serving as voltage comparator circuits, resistors R11, R12 and R13, and gate AND 4 serves as a window comparator which identifies or discriminates the voltage signal input to the electronic flash device through terminal T6' and terminal T6 on the camera body. This window comparator circuit determines, according to the level of the voltage, whether the voltage signal at terminal T6' is a preliminary flash light start signal or a flat flash light start signal. It is assumed that the voltage levels developing at node T8 between resistors R11 and R12 and at node T9 between resistors R12 and R13 are Vre1 and Vre2, respectively. These voltage levels are set such that the relationships of Vs1>Vre1 and Vre1>Vs2>Vre2 may be established with respect to voltage Vs1 generated at terminal T6 when the current of constant current source I2 flows only through resistor R3 in the exposure control circuitry of FIG. 1; and voltage Vs2 generated when the current flows through the parallel connected resistors R2 and R3 of FIG. 1, respectively. With respect to the voltage signal generated at terminal T6 before synchro switch X is closed, voltage Vs1 is used as a preliminary flash light start signal and the voltage Vs2 as a flat flash light start signal. Moreover, voltage signal Vs1 generated after synchro switch X has been closed is used as a flash light terminating signal.

When the preliminary flash light start signal voltage Vs1 is applied to terminal T6', both the outputs of voltage comparator circuits OP7 and OP8 change to a "High" level. The "High" level signal of voltage comparator circuit OP7 serves as a blocking signal to gate AND 4, causing the output thereof to be at a "Low" level relative to signal voltage Vs1. It is to be noted that a circuit comprising resistor R14 and capacitor C6 filters the spike-shaped voltage signal generated at the output of gate AND 4 at the rise time or breaking time of signal voltage Vs1.

When flat flash light start signal voltage Vs2 is applied to terminal T6', the outputs of voltage comparator circuits OP7 and OP8 are at "low" and "High" levels, respectively. Since gate AND 7 is unblocked in this case, switch SW9 is connected to terminal a9 and the voltage at terminal T11 is "High". The voltage at terminal T13, connected to one of the inputs of gate AND 7, changes to a "High" level by the "High" output of gate AND 4, as that gate is unblocked because the voltage at terminal T12 is "Low" and the output of operational amplifier OP8 is "High".

Thus, terminal T12 is at a "High" level for voltage Vs1, while terminal T13 is at a "High" level for voltage Vs2, whereby the input signal is identified by subsequent logic circuitry to be described hereinafter. It should be noted that although a "High" level voltage signal is supplied from voltage comparator circuit OP8 to gate AND 8 when the voltage at terminal T6' is either Vs1 or Vs2, the input applied only after synchro switch X has been closed, namely, only the flash light terminating signal is allowed to pass through gate AND 8. Gate AND 8 is unblocked when synchro switch X is closed as terminal T5' is grounded, the voltage at terminal T10 is "High", transistor Q11 is conductive, and the voltage at terminal 11 is at ground potential. Thus, the middle input of gate AND 8 is conditioned to unblock. Also the input terminal of gate AND 8 is connected to terminal T14 (with switch SW9 connected to contact b9) and therefore the voltage at terminal T14 is "High" to condition that input terminal of gate AND 8 to unblock.

Light measuring circuit A9 generates a signal to stop the flash light emission of the electronic flash device when the integrated value of the light reflected from a photographic object reaches a level for providing a suitable exposure. Switch SW10 is connected to contact a10 when the electronic flash device is used as an ordinary automatic light controlled electronic flash device which generates normal flash light with its intensity sharply rising and dropping.

Figure 4:
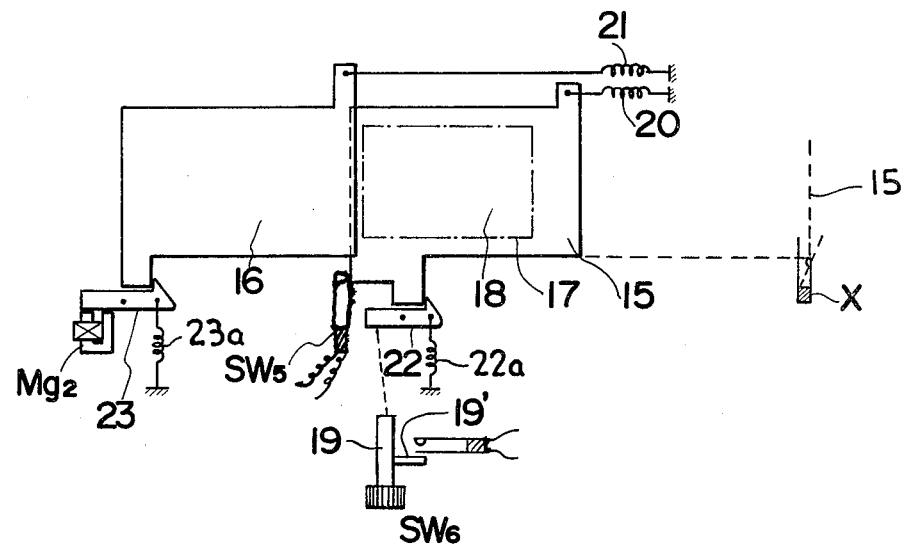
FIG. 4 is a schematic illustration of an exemplary type of shutter mechanism that can be used in conjunction with the invention.

With reference to FIG. 4, which schematically illustrates an exemplary type of shutter mechanism for operating switches X, SW5 and SW6, leading and trailing shutter plates 15 and 16 are respectively biased by springs 20 and 21 to the right. When shutter restraining lever 22 is turned clockwise against the bias force of compression spring 22a in response to depression of shutter release button 19 (upward movement in FIG. 4), leading shutter plate 15 is released and allowed to start traveling for uncovering and exposing the film at the exposure plane shown by dotted line 18. Upon the movement of leading shutter plate 15, switch SW5 is released to open. When electromagnet Mg2 is de-energized by the control circuit described above, after a lapse of a desired time from the actuation of leading shutter plate 15, lever 23 is turned clockwise by the force of spring 23a to release trailing shutter plate 16 which starts traveling for exposure termination. Switch SW6 is closed by pin 20 when shutter release button 19 is depressed (upwardly as illustrated in FIG. 4).

The overall operation of the above described exposure time control circuitry and the electronic flash tube control circuit is as follows.

Figure 3:
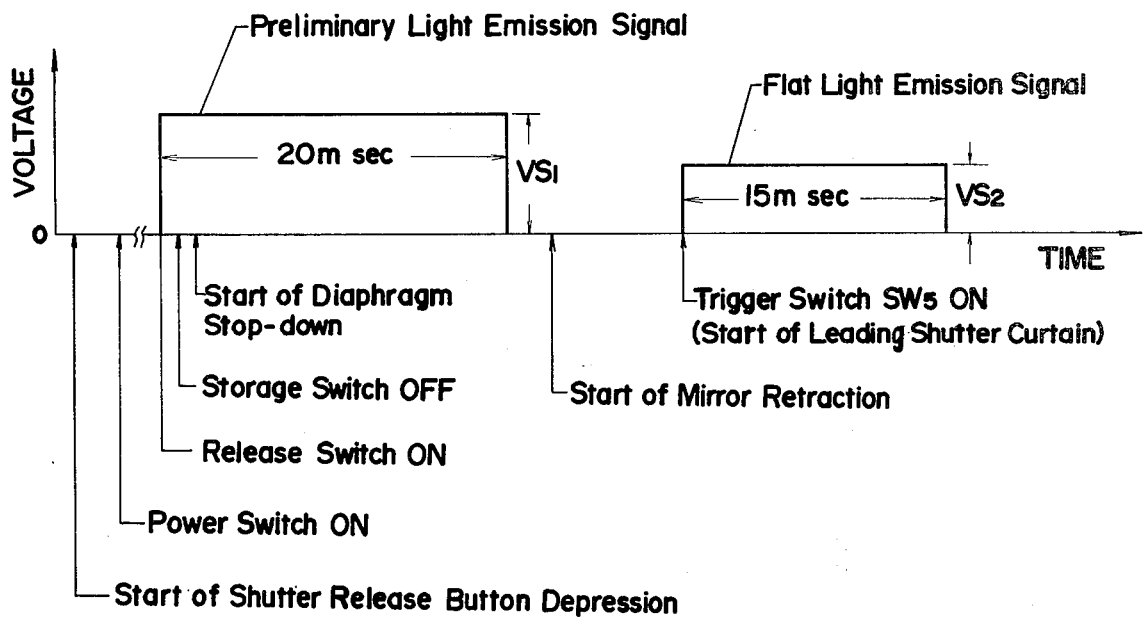
FIG. 3 is a time chart illustrating the sequential operation of various components of the exposure control circuitry of FIG. 1.

For the preliminary flash light mode, switches SW2 and SW3 are connected to respective contacts c2 and c3, and switch SW4 is connected to contact b4 in the exposure time control circuit of FIG. 1. Furthermore, switches SW8, SW9 and SW10 of the electronic flash tube control circuit of FIG. 2 are connected to contacts b8, b9 and b10, respectively. Power switch SW7 is assumed to be closed and main capacitor C3 is assumed to have been charged. When the shutter button is depressed and release switch SW6 of FIG. 1 is closed, a "High" level pulse is generated from one-shot circuit A5 (for the duration of voltage Vs1 as illustrated in FIG. 3), whereby transistor Q6 is turned off and signal voltage Vs1 (as shown in FIG. 3) is generated from terminal T6. As a result, terminal T12 of the flash device changes to a "High" level (as described previously) and this voltage is transmitted through gate AND 6 and OR 2 to gates AND 3 to turn on transistor Q9 and also to gate OR 3 to turn on SCR1 by the output of gate OR 3. Thus, the trigger circuit 2 operates and capacitor C3 is discharged through flash tube Tu, coil C0 and transistor Q9 so that flash tube Tu is fired for the emission of preliminary flash light as described earlier. Upon extinction of a pulse from one-shot circuit A5, the outputs of gates AND 2 and NOR 1 invert respectively to "Low" and "High" level to turn on transistor Q6. Accordingly, the potentials at terminals T6 and T6' change respectively to a "Low" level to invert both the outputs of voltage comparator circuits OP7 and OP8 to "Low" levels. This "Low" levels block gates AND 6 and AND 7, and accordingly gate AND 3 to turn off transistor Q9 and interrupt the energizing current for flash tube Tu. Thus, the flash light is terminated. The preliminary flash light is used to determine the diaphragm aperture to a specific size or value e.g., F.5,6, even when an object is dark in the ambient light.

Trigger switch SW5 is opened in synchronization with the shutter release operation to initiate exposure time counting operation. With switch SW5 opened, a pulse is generated from one-shot circuit A6, in response to which signal voltage Vs2 is generated from terminal T6. Terminal T13 in the flash circuit changes to a "High" level in response to signal voltage Vs2 as previously described. In the preliminary flash light mode, however, as switch SW9 is connected to contact b9, causing gate AND 7 to remain blocked, flat flash light is not emitted. When the shutter is fully opened (as shown by the phantom line 15' in FIG. 4), synchro switch X is closed, and thyristors SCR1 and SCR2 are both triggered to fire flash tube Tu, thereby providing illumination light to an object. The triggering of SCR1 and SCR2 is as follows. The closure of synchro switch X grounds terminals T5 and T5'. Preliminary flash light switch SW9 is connected to terminal b9 which unblocks gate AND 5 such that the high level signal from NOT3 appears at the gate of SCR1 through gate AND 5 and gate OR 3 and at the gate of SCR2 through gate AND 5.

At this time in the exposure time control circuit of FIG. 1, a current commensurate with the intensity of the light reflected from the film surface under exposure in the camera is charged by integration capacitor C2. When the charged voltage of capacitor C2 reaches a predetermined value, the output of switching circuit A2 is inverted, and in response thereto, voltage signal Vs1 is generated from terminal T6 as described previously. At this time, as synchro switch X has been closed, gates AND 6 and AND 7 of the flash device are blocked by the "Low" or ground voltage at terminal T11 as transistor Q11 is conductive by the "High" output of inverter NOT3 (the input of which is grounded) with gate AND 8 remaining blocked. In response to voltage signal Vs1 due to the output from one-shot circuit A4 and applied to terminal T6', the output of gate AND 8 changes to a "High" level, causing discharge tube Td to be ignited as the output of gate AND 8 triggers trigger circuit 4 through switch SW10 (closed on contact b10) and gate OR 4, whereby the flash light emission of flash tube Tu is terminated. At this time, the trailing shutter curtain 16 (FIG. 4) starts traveling to terminate exposure.

Referring next to the flat flash light mode, flat flash light may be used for photographing a dark scene at a high-speed shutter, e.g., at 1/500 second, provided by a slit exposure wherein the slit formed by the shutter curtains sweeps the film plane. Switches SW2 and SW3 of the exposure time control circuit of FIG. 1 are respectively connected to contacts a2 and a3, and the shutter speed is set to 1/500 second on potentiometer PM2. Furthermore, the diaphragm is preset to a proper value in view of the camera-to-object distance and the shutter speed. It should be understood that a calculating means may be preferably provided to indicate the proper diaphragm value. Such indication means may include a calculation table which indicates a flash guide number corresponding to a set shutter speed in view of the intensity of the flash light proper to the flash device in use and then indicates the proper or suitable diaphragm value relative to the guide number and the camera-to-object distance. Switch SW4 may be connected to either contact a4 or b4 in this case.

Switches SW8 and SW9 of the electronic flash tube control circuit of FIG. 2 are connected to contacts a8 and a9, respectively. Thus, gates AND 5, AND 6 and AND 8 remain blocked, whereby preliminary flash light, ordinary flash light or flash light stop operations are prohibited. In response to the opening of counter switch SW5 following the shutter release operation, a pulse whose duration is 15 ms, for example, is generated from one-shot circuit A6, during which transistors Q6 and Q7 are respectively turned off and on, whereby voltage signal Vs2 is generated at terminals T6, T6'.

In response to the voltage signal Vs2, the output of voltage comparator OP8 changes to a "High" level, while the output of voltage comparator OP7 remains at a "Low" level, whereby the output of gate AND 4 changes to a "High" level. As gate AND 7 is unblocked due to the connection of switch SW9 to contact a9 and a "High" level at terminal T11, the "High" level from gate AND 4 is transmitted through gates AND 7 and OR 2 to gate AND 3 to turn on transistor Q9 by the output of gate AND 3 and also to the gate of SCR1 through gate OR 3. Thus, flash tube Tu is fired in a similar manner to the preliminary flash light mode, but the level of the flash light is controlled by the reference voltage at terminal T16, whereby flat flash light is emitted for 15 ms.

The time of 15 ms is assumed to be sufficient to cover the time for the high-speed shutter operation, e.g., over 1/250 second during which the exposure slit completes its travel over the film plane. Assuming that the average intensity of the current flowing through flash tube Tu is 40 A, the amount of the electric charge to be discharged for 15 ms will be 0.6 Coulomb, and when this amount of charge is charged at a voltage of 300 V, capacitor C3 must have a capacitance of 2000 $\mu$F. The charge of capacitor C3 is not completely discharged, and in practice a capacitor having larger capacity than the aforementioned calculated value should be employed, such that a slight amount of charge remains in the capacitor after the termination of flash light. It should be noted that the discharge current, e.g., of the intensity of 5a on average, flows through flash tube Tu for 20 ms to generate the preliminary flash light. The charge required for the preliminary flash light is 0.1 Coulomb, and sufficient charge remains in capacitor C3 to produce ordinary flash light even after the preliminary flash light is produced.

The following description is of flash photography operation in the manual mode. Changeover switches SW2 and SW3 of the exposure time control circuit of FIG. 1 are set to a position identical to that for the flat flash light, i.e., respectively at contacts a2 and a3, and a shutter speed is set to an ordinary flash synchronizable speed, e.g., 1/60 second. Switch SW9 of the electronic flash tube control circuit of FIG. 2 is connected to contact b9 and switch SW10 to contact a10. With these settings, the electronic flash device functions as an ordinary automatic light controlled type device. Even when release switch SW6 is closed in response to the shutter release operation, the input of gate AND 2 connected to terminal T4 is grounded through switch SW3 closed on contact a3 to block the gate, causing no preliminary flash light signal to be supplied from one-shot circuit A5 to the flash device. However, when counter switch SW5 is opened, a flat flash light signal is provided to the electronic flash tube control circuit of FIG. 2. But in that circuitry, gate AND 7 is blocked, causing no flat flash light to be produced. When the shutter is fully opened and synchro switch X is closed the output of inverter NOT3 in the electronic flash tube control circuit is inverted from a "Low" to a "High" level. In response to that inversion, thyristors SCR1 and SCR2 are respectively triggered through gate AND 5, gate OR 3 and gate AND 5 to cause flash tube Tu to emit flash light, the intensity of which is sharply rising and falling as in ordinary flash devices. The light reflected from an object is monitored by light measuring circuit A9. When its integrated value reaches a predetermined value, a pulse is input to trigger circuit 4 from the output of light measuring circuit A9, closed contact a10 and gate OR 4 to stop flash light emission by the energization of flash extinguishing tube Td. Thus, flash tube Tu is stopped from emitting flash light.

When mounted on an ordinary camera, the electronic flash device appears to function as an ordinary automatic light controlled type flash device. It is apparent that terminals T5' and T6' are designed to connect to synchro switch terminals.

Although the present invention has been described with respect to one exemplary embodiment of the best mode of carrying out the invention, it is not limited to such embodiment but may have a variety of modified forms and may also be applicable to a variety of different type shutters. For example, the shutters to which the present invention may be applied, are not limited to the type wherein a pair of shutter curtains or metal shutter plates travel successively across the focal plane vertically or horizontally, but may, for example, include the shutter type having a plurality of sets of shutter blades with each set driven one after another to open and close the exposure aperture of the camera; and also, the shutter type having a pair of discs, each having an aperture and being rotated one after another. With these various types of shutters, the slit exposure might not be effected at low shutter speed. However, the present invention is fully effective for the shutter type with which the slit exposure occurs at any shutter speed. Moreover, the present invention is also applicable to such types of cameras having a shutter curtain, plate or disc which is formed with a fixed or preadjustable size of slit or aperture, or cameras wherein the shutter member (or members) travel in a plane somewhat distant from the focal plane.

Furthermore, various known circuits and mechanisms may be employed in the exposure time control and electronic flash tube control circuits. The electronic flash may be either built in the camera or separated therefrom and detachably coupled thereto.

Those skilled in the art will also recognize that the exposure and flash control system of the present invention as described herein is capable of being modified in accordance with known principles and techniques applicable to the art of photography, and therefore the present invention is not intended to be limited by the specific embodiment herein described but the scope of the invention is to be determined by the following claims with consideration being given to the equivalence of the claimed components, individually and collectively in combination.

What is claimed is:

1. A flash photography system for a camera, comprising:
    shutter means for exposing the film with a slit sweeping over the film surface;
    electrical circuit means for measuring and controlling the exposure time of said shutter means;
    means for initiating operation of said shutter means;
    a trigger switch for initiating the exposure time measurement of said electric circuit means in synchronization with the initiation of operation of said shutter means;
    a signal generation circuit for generating an output signal in response to the operation of said triger switch;
    an electronic flash tube for emitting flash light for illuminating a scene to be photographed;
    means for supplying electrical power to said electronic flash tube;
    a trigger circuit means for triggering the light emission of said electronic flash tube in response to said signal;
    a light control circuit means for controlling the electrical power supplied to said electronic flash tube, and including a switching element for connecting and disconnecting said flash tube and said electrical power supplying means to each other, detection means for detecting the light emitted from said flash tube and light control means for controlling said switching element in accordance with the output of said detection means for a time period during which the exposure slit keeps travelling;
    said light control means for controlling said switching element includes first level setting means for generating a first level signal, second level setting means for generating a second level signal, comparison means for controlling said switching element in accordance with the comparison of the output of said detection means with said first or second level signal, and first selection means for selectively connecting said first and second level signal with said comparison means, said first level signal providing a higher flash light intensity than said second level signal, and;
    said light control means controlling the flash light intensity to be constant with selection of each said first and second level signals.

2. A flash photography system as claimed in claim 1 further comprising switch means for by-passing said switching element such that said flash tube emits light without being controlled at constant intensity, and second selection means for selectively enabling said light control means and said switch means.

3. A flash photography system as claimed in claim 2 further comprising sequence control means cooperable with said first and second selection means for causing, prior to the shutter operation, flash light emission controlled by said light control circuit means with reference to said second level signal, and subsequently, in relation to the shutter operation, flash light emission through said switch means when said first selection means connects said second level setting means to said comparison means and said second selection means enables said switch means, and for causing, in relation to the shutter operation, flash light emission controlled by said light control circuit means with reference to said first level signal.

4. A flash photography system for a camera, comprising:
- shutter means for exposing the film with a slit sweeping over the film surface;
- electrical circuit means for measuring and controlling the exposure time of said shutter means;
- means for initiating operation of said shutter means;
- a trigger switch for initiating the exposure time measurement of said electric circuit means in synchronization with the initiation of operation of said shutter means;
- a signal generation circuit for generating an output signal in response to the operation of said trigger switch;
- an electronic flash tube for emitting flash light for illuminating a scene to be photographed;
- means for supplying electrical power to said electronic flash tube;
- a trigger circuit means for triggering the light emission of said electronic flash tube in response to said output signal;
- a light control circuit means for controlling the electrical power supplied to said electronic flash tube and including means for selectively setting the intensity of the flash light to at least respective first and second light levels, with said first level being higher than said second level, selection means for selecting at least said first and second light levels, and means for triggering the light emission of said electronic flash tube prior to the operation of said shutter means with said selection means selecting said first light level;
- a timing circuit for controlling the duration of said flash light and including a one-shot circuit for generating a continuous signal for a given period in response to the operation of said trigger switch, and a gate circuit responsive to said continuous signal for maintaining said light control circuit means oprative, and;
- said light control circuit means controlling the flash light intensity to be constant with selection of each said first and second light levels.

5. In a flash photography system in combination with a camera and an electronic flash device, said camera comprising:
- shutter means for exposing the film with a slit sweeping over the film surface;
- exposure time control means for measuring and controlling the exposure time of said shutter means;
- means for initiating operation of said shutter means;
- a first trigger switch for initiating the exposure time measurement of said exposure time control means in synchronization with the initiation of operation of said shutter means;
- a first signal generation circuit for generating a first output signal in response to the operation of said first trigger switch;
- said electronic flash device comprising:
- a flash tube for emitting flash light for illuminating a scene to be photographed;
- means for supplying electrical power to said flash tube;
- trigger circuit means for triggering the light emission of said flash tube in response to said output signal;
- flash light control means for controlling the electrical power supplied to said flash tube;
- said camera further comprising:
- a camera objective diaphragm means;
- a light measuring circuit for measuring light from the scene to be photographed;
- a diaphragm control means for controlling the diaphragm means in accordance with the output of said light measuring circuit, and actuation means for initiating camera operation including operation of said diaphragm means and subsequent operation of said shutter means;
- a second trigger switch operable in response to the operation of said actuation means; and
- a second signal generation means for generating a second output signal in response to the operation of said second trigger switch; and
- said flash light control means includes:
- means for selectively setting the intensity of the flash light to at least respective first and second light levels, with said first light level being higher than said second light level;
- a first selection means for selecting at least said first and second light levels;
- means for triggering the light emission of said electronic flash tube in response to said second output signal with said selection means selecting said first light level, whereby the light measurement for the diaphragm control is effected while the scene to be photographed is being illuminated by the first light level flash light; and
- means for triggering the light emission of said electronic flash tube in response to said first signal output with said selection means selecting said second light level, and;
- said flash light control means controlling the flash light intensity to be constant with selection of each said first and second light levels.

6. A flash photography system as claimed in claim 5 wherein said shutter means includes a leading shutter member and a trailing shutter member adapted to travel across the film surface one after another at an interval controlled by said exposure time control means, said camera further includes a third trigger switch operable upon completion of travel of said leading shutter member, and said electronic flash device further includes bypass switch means for connecting said flash tube to said power supply means bypassing said flash light control means for normal flash light emission, means for actuating said bypass switch means in response to the operation of said third trigger switch with said selection means selecting said second level.

7. A flash photography system as claimed in claim 5 wherein said exposure time control means includes means for integrating the output of said light measuring circuit upon the initiation of operation of said shutter means, and means for generating a shutter closing signal in accordance with the integrated output, and said electronic flash device further includes means for terminating said normal flash light emission in response to said shutter closing signal.

8. A flash photography system as claimed in claim 7 wherein said electronic flash device is detachable from said camera, and said camera further includes a first output terminal, a control signal generator for generating, at said first output terminal, a first control signal in response to the output signal from said first signal generation circuit and a second control signal in response to the output signal from said second signal generation circuit, and said electronic flash device further includes a first input terminal arranged to be connected with said first output terminal with said electronic flash device coupled with said camera, and discrimination means for detecting which of said first and second control signals is applied to said input terminal and for controlling said flash light control means such that the flash light emission is caused at said first level with said first control signal detected and at said second level with said second control signal detected.

9. A flash photography system as claimed in claim 8 wherein said camera further comprises a second output terminal connected with said third trigger switch, and means for generating said second control signal at said first output terminal in response to said shutter closing signal, and said electronic flash device further includes a second input terminal arranged to be connected with said first output terminal with said electronic flash device coupled with said camera, and means for causing said normal flash light termination in response to said second control signal with said third trigger switch oerated.

10. A flash photography system as claimed in claim 9 wherein said camera further includes means for inhibiting the generation of said first and second control signal.

11. A flash photography system as claimed in claim 10 wherein said electronic flash device further comprises second light measuring means for directly measuring light from the scene to be photographed and means for controlling termination of normal flash light emission in accordance with the output of said second light measuring means, and means for selectively coupling said last mentioned means with said flash tube.

* * * * *